US009505645B2

(12) United States Patent
Miyoshi et al.

(10) Patent No.: US 9,505,645 B2
(45) Date of Patent: Nov. 29, 2016

(54) VACUUM DEGASSING APPARATUS, APPARATUS FOR PRODUCING GLASSWARE, AND METHOD FOR PRODUCING GLASSWARE

(71) Applicant: ASAHI GLASS COMPANY, LIMITED, Chiyoda-ku (JP)

(72) Inventors: Wataru Miyoshi, Chiyoda-ku (JP); Hiroaki Hamamoto, Chiyoda-ku (JP); Suguru Kobayashi, Chiyoda-ku (JP); Toshiyuki Uematsu, Chiyoda-ku (JP); Michito Sasaki, Chiyoda-ku (JP)

(73) Assignee: Asahi Glass Company, Limited, Chiyoda-ku (JP)

( * ) Notice: Subject to any disclaimer, the term of this patent is extended or adjusted under 35 U.S.C. 154(b) by 325 days.

(21) Appl. No.: 14/011,822

(22) Filed: Aug. 28, 2013

(65) Prior Publication Data

US 2013/0340478 A1 Dec. 26, 2013

Related U.S. Application Data

(63) Continuation of application No. PCT/JP2012/058987, filed on Apr. 2, 2012.

(30) Foreign Application Priority Data

Mar. 31, 2011 (JP) ................. 2011-078365

(51) Int. Cl.
*C03B 5/225* (2006.01)
(52) U.S. Cl.
CPC ................. *C03B 5/2252* (2013.01)
(58) Field of Classification Search
CPC .................................. C03B 5/2252
USPC ....................................... 65/134.2
See application file for complete search history.

(56) References Cited

U.S. PATENT DOCUMENTS

| 5,851,258 A * | 12/1998 | Ando ................. C03B 5/2252 |
| | | 138/106 |
| 6,119,484 A | 9/2000 | Takei et al. |
| 6,287,337 B1 * | 9/2001 | Martakos ................. A61F 2/06 |
| | | 623/1.39 |
| 2005/0160769 A1 | 7/2005 | Sakai et al. |

(Continued)

FOREIGN PATENT DOCUMENTS

| EP | 2 248 774 A1 | 11/2010 |
| JP | 11-139834 | 5/1999 |

(Continued)

OTHER PUBLICATIONS

International Search Report mailed on Jul. 3, 2012, issued for International Application No. PCT/JP2012/058987, filed on Apr. 2, 2012 (English).

*Primary Examiner* — Angela Ortiz
*Assistant Examiner* — Cynthia Szewczyk
(74) *Attorney, Agent, or Firm* — Oblon, McClelland, Maier & Neustadt, L.L.P.

(57) ABSTRACT

It is an object of the present invention to provide a vacuum degassing apparatus configured so as to be capable of carrying out more simply exchange operation for an extension pipe made of heat-resisting metal and immersed in molten glass.
The present invention includes a vacuum housing, a vacuum vessel, an introduction pipe and a discharge pipe which are assembled by a plurality of bricks, and an extension pipe connected to at least one of the introduction pipe and the discharge pipe and made of heat-resisting metal. The extension pipe is constituted by a base end portion, a body portion formed so as to be continuous to the base end portion, and a sealing flange extending from an outer peripheral side of the body portion.

20 Claims, 7 Drawing Sheets

(56) References Cited

U.S. PATENT DOCUMENTS

2009/0165501 A1* 7/2009 Sasaki ............... C03B 5/2252
  65/134.2
2013/0186142 A1* 7/2013 Nagata ............... C03B 5/2252
  65/83

FOREIGN PATENT DOCUMENTS

| JP | 2003-137556 A | 5/2003 |
|---|---|---|
| WO | 2007/020773 A1 | 2/2007 |
| WO | WO 2007/020754 A1 | 2/2007 |

* cited by examiner

VACUUM DEGASSING APPARATUS, APPARATUS FOR PRODUCING GLASSWARE, AND METHOD FOR PRODUCING GLASSWARE

TECHNICAL FIELD

The present invention is related to a vacuum degassing apparatus, a glass product producing apparatus including the vacuum degassing apparatus, and a process for producing glass products.

BACKGROUND ART

A vacuum degassing apparatus has been conventionally known to remove bubbles generated in molten glass prior to forming of the molten glass in a forming apparatus, the molten glass being produced in a melting tank, so that the quality of glass products can be improved.

One structural example of such a vacuum degassing apparatus is shown in FIG. 7. The vacuum degassing apparatus 100 shown in FIG. 7 is an apparatus which is used in a process for vacuum-degassing molten glass G housed in a melting tank 101 and continuously supplying the vacuum-degassed molten glass to a subsequent treatment tank, and the interior of which is maintained in a reduced pressure state.

In the vacuum degassing apparatus 100, a vacuum vessel 105 is horizontally disposed in a vacuum housing 103, and the vacuum vessel has an uprising pipe 106 vertically mounted to a lower inlet side and a downfalling pipe 107 vertically mounted to a lower outlet side.

The uprising pipe 106 communicates with the vacuum vessel 105, and molten glass G prior to degassing treatment is sucked up from the melting tank 101 and is introduced into the vacuum vessel 105. The downfalling pipe 107 communicates with the vacuum vessel 105, and the degassed molten glass G is caused to come down from the vacuum vessel 105 and is discharged into the next treatment vessel (not shown). The vacuum housing 103 has a heat-insulating material 108, such as heat-insulating bricks) disposed therein so as to surround the vacuum vessel 105, the uprising pipe 106 and the downfalling pipe 107 for heat insulation covering.

The vacuum housing 103 is made of metal, such as stainless steel, and is vacuumed from outside by e.g. a vacuum pump (not shown) such that the interior of the vacuum vessel 105 housed in the vacuum housing is maintained in a certain reduced pressure, such as a reduced pressure state having about $\frac{1}{20}$ to $\frac{1}{3}$ atmospheric pressure for vacuum treatment.

In the vacuum degassing apparatus 100, since the molten glass G having a temperature, such as 1,200 to 1,400° C. is subjected to vacuum treatment, each of the vacuum vessel 105, the uprising pipe 106 and the downfalling pipe 107 needs to be made of a material having an excellent heat resistance and a low reactivity to the molten glass G having a high temperature.

When the vacuum degassing apparatus 100 has a small size, it is acceptable that each of the vacuum vessel 105, the uprising pipe 106 and the downfalling pipe 107 is made of a precious metal material having an excellent heat resistance, such as platinum or a platinum alloy. However, when each of the vacuum vessel 105, the uprising pipe 106 and the downfalling pipe 107 is made of a precious metal material in production equipment having a large size, the equipment cost is raised, which creates a problem of being difficult to realize such equipment.

From this point of view, as an apparatus to be capable of solving this problem, there is a proposed a vacuum degassing apparatus 120 shown in FIG. 8, which is configured such that a vacuum vessel 105, an uprising pipe 106 and a downfalling pipe 107 are made of refractory bricks, and the uprising pipe 106 and the downfalling pipe 107 have extension pipes 110 and 111 made of a precious metal material, such as platinum or a platinum alloy, connected to lower ends thereof (see Patent Document 1).

PRIOR ART DOCUMENT(S)

Patent Document(s)

Patent Document 1: JP-A-11-139834

DISCLOSURE OF INVENTION

Technical Problem

In the vacuum degassing apparatus 120 shown in FIG. 8, the uprising pipe 106 and the downfalling pipe 107 are held in a vacuum housing 103, and the extension pipes 110 and 111 made of a precious metal material are disposed at lower ends of the uprising pipe and the downfalling pipe so as to extend outside the vacuum housing 103, respectively. In the vacuum degassing apparatus 120 shown in FIG. 8, although the extension pipes 110 and 111 have lower ends immersed in molten glass G, it is easy to establish structures for supporting the extension pipes 110 and 111 since the extension pipes 110 and 111 are entirely made of a precious metal material. For example, the structure for supporting the extension pipes 110 and 111 may be supposed on the bottom side of the vacuum housing 103. When only the extension pipes 110 and 111 are made of a precious metal material, and when the uprising pipe 106 and the downfalling pipe 107 are made of bricks, it is possible to have an advantageous structure in terms of equipment cost since the amount of expensive precious metal can be reduced.

However, the vacuum degassing apparatus 120 having such a structure shown in FIG. 8 has a problem described below. Structures made of refractory bricks are usually supposed to be capable of withstanding a long term of use according to the lifetime of the refractory bricks. However, in the structure of the vacuum degassing apparatus 120 with the extension pipes 110 and 111 made of a precious metal material shown in FIG. 8, even when the extension pipes 110 and 111 are made of a precious metal material having an excellent heat resistance, the extension pipes 110 and 111 are damaged in some cases because the lower ends of the extension pipes 110 and 111 are constantly kept immersed in molten glass G having a high temperature. For example, even if the extension pipes 110 and 111 are produced so as to have substantially the same lifetime as refractory bricks by properly determining the thickness of the pipes and the material and composition constituting the pipes in terms of lifetime, the generation of a heterogeneous basis material or a composition variation in the molten glass G, or a change in the composition of the molten glass G per se to be produced has caused the extension pipes to be subjected to unexpected deterioration and to be damaged prior to lapse of lifetime in some cases.

For this reason, the vacuum degassing apparatus 120 is desired to have a structure which is capable of exchanging the extension pipes 110 and 111 as needed. The structure for supporting the extension pipes 110 and 111 disclosed in Patent Document 1 is, however, configured to provide flanges with upper end portions of the extension pipes 110 and 111 and place the respective flanges into a horizontal joint between adjacent refractory bricks constituting a lower end portion of the uprising pipe 106 and a horizontal joint between adjacent refractory bricks constituting a lower end portion of the downfalling pipe 107 for supporting the extension pipes.

When the uprising pipe 106 and the downfalling pipe 107 are built by bricks, it is preferred that the bricks in contact with the molten glass G be fused cast bricks having an excellent erosion resistance and that bricks having heat resistance are disposed outside the fused cast bricks in a horizontal direction.

When the molten glass G erodes the joint between adjacent bricks and reach a refractory brick outside the fused cast bricks, the refractory brick is eroded by remolten glass G. In order to avoid the erosion, it is required that the extension pipes 110 and 111 made of a precious metal material having an excellent corrosion resistance be brought into more inner positions than lower end openings of the uprising pipe 106 and the downfalling pipe 107 such that the extension pipes partly overlap with the uprising pipe and the downfalling pipe 7.

The above-mentioned structure, however, creates a problem in that a great deal of work is needed to partly disassemble the uprising pipe 106 and the downfalling pipe 107 because it is necessary not only to disassemble the refractory bricks constituting the lower end portion of the uprising pipes 106 and the lower end portion of the downfalling pipe 107 but also to remove the extension pipes 110 and 111 for exchanging the extension pipes with different ones. For example, after the molten glass G is evacuated from the vacuum vessel 105, it is required that the reduced pressure state in the vacuum vessel be open to atmosphere, the uprising pipe 106 and the downfalling pipe 107 be cooled, and the vacuum housing be partly disassembled, followed by disassembling the bricks constituting the uprising pipe 106 and the downfalling pipe 107. This problem cannot be solved simply. This problem is also created even when the uprising pipe and the downfalling pipe are not vertically connected to the extension pipes in a case shown in FIG. 8.

When the disassembling work is carried out after the lower end portion of the uprising pipe 106 and the lower end portion of the downfalling pipe 107 have been cooled, the fused cast bricks that have been brought in contact with the molten glass are cooled. When the fused cast bricks that have been once immersed in the molten glass to be heated to a high temperature of 1,200 to 1,400° C. are even temporarily cooled to normal temperature, it is likely that the surface of fused cast bricks is damaged such that the damaged brick cannot be reused.

The present invention is proposed, taking into account the above-mentioned circumstances. It is an object of the present invention to provide a vacuum degassing apparatus having a structure wherein an extension pipe, which is made of heat-resisting metal and is supposed to be immersed in molten glass, can be exchanged for a different one more simply than the conventional structures.

It is another object of the present invention to provide a process for producing glass products by use of a vacuum degassing structure having such a structure and to provide an apparatus including the vacuum degassing structure for producing glass products.

Solution to Problem

The present invention provides a vacuum degassing apparatus for molten glass, which includes a vacuum housing, the interior of which is vacuumed; a vacuum vessel disposed in the vacuum housing for introducing molten glass thereinto; an introduction pipe and a discharge pipe disposed in the vacuum housing and assembled by a plurality of bricks, the introduction pipe and discharge pipe being respectively disposed upstream and downstream the vacuum vessel for introducing and discharging the molten glass, the introduction pipe and the discharge pipe being connected to the vacuum vessel; and an extension pipe connected to at least one of an upstream end of the introduction pipe and a downstream end of the discharge pipe and made of heat-resisting metal; the extension pipe including a base end portion formed on one end close to the vacuum vessel, a body portion formed so as to be continuous to the base end portion, and a sealing flange extending from an outer peripheral side of the body portion and mounted so as to cover through holes from an outer side of an outer wall for the vacuum housing, the sealing flange being positioned at at least one of the introduction pipe and the discharge pipe; and the extension pipe being detachably fixed to the outer side of the outer wall through a fixing structure disposed on an outer peripheral portion of the sealing flange at a position where the base end portion is received in an end brick constituting an opening on the upstream end of the introduction pipe or the downstream end of the discharge pipe.

In the present invention, it is preferred that the apparatus include the vacuum housing, the interior of which is vacuumed; the vacuum vessel disposed in the vacuum housing for introducing molten glass the vacuum vessel; an uprising pipe as the introduction pipe and a downfalling pipe as the discharge pipe disposed in the vacuum housing and assembled by the plurality of bricks, the introduction pipe and discharge pipe being respectively disposed upstream and downstream the vacuum vessel for introducing and discharging the molten glass, the introduction pipe and the discharge pipe being connected to the vacuum vessel; and the extension pipe connected to at least one of the uprising pipe and the downfalling pipe and made of heat-resisting metal; the extension pipe including the base end portion formed on an upper end, the body portion formed so as to be continuous to the base end portion, and the sealing flange extending from the outer peripheral side of the body portion and mounted so as to cover the through holes from the outer side of the outer wall for the vacuum housing, the sealing flange being positioned at a lower end of at least one of the uprising pipe and the downfalling pipe; and the extension pipe being detachably fixed to the outer side of the outer wall through the fixing structure disposed on the outer peripheral portion of the sealing flange at the position where the base end portion is received in the end brick constituting a lower end opening of the uprising pipe or a lower end opening of the downfalling pipe.

In the vacuum degassing apparatus for molten glass according to the present invention, it is preferred that the introduction pipe be constituted by assembling inner armoring bricks in contact with the molten glass and outer armoring bricks disposed outside the inner armoring bricks in a radial direction of the introduction pipe; the discharge pipe be constituted by assembling inner armoring bricks in contact with the molten glass and outer armoring bricks disposed outside the inner armoring bricks in a radial direction of the discharge pipe; the outer wall of the vacuum housing have an extended portion extending more inward than the outer armoring bricks in the radial direction of the introduction pipe or the discharge pipe at a position where the outer wall is brought into contact with the upstream end of the introduction pipe or the downstream end of the discharge pipe; and the end brick be supported by the extended portion of the outer wall.

In the vacuum degassing apparatus for molten glass according to the present invention, it is preferred that the uprising pipe be constituted by assembling inner armoring bricks in contact with the molten glass and outer armoring bricks disposed outside the inner armoring bricks in a radial direction of the uprising pipe; the downfalling pipe be constituted by assembling inner armoring bricks in contact with the molten glass and outer armoring bricks disposed outside the inner armoring bricks in a radial direction of the downfalling pipe; the outer wall of the vacuum housing have an extended portion extending more inward than the outer armoring bricks in the radial direction of the uprising pipe or the downfalling pipe at a position where the outer wall is brought into contact with the lower end of the uprising pipe or the lower end of the downfalling pipe; and the end brick be supported by the extended portion of the outer wall.

In the vacuum degassing apparatus for molten glass according to the present invention, it is preferred that the end brick have a through hole formed therein so as to pass the molten glass therethrough; the through hole have a large diameter portion formed in an opening thereof close to the outer wall and a small diameter portion formed so as to be continuous to the large diameter portion; and the extension pipe have an expanded portion expanding outward in a position close to the base end portion thereof in a deepest area of the large diameter portion.

In the vacuum degassing apparatus for molten glass according to the present invention, the small diameter portion may have a protection member made of heat-resisting metal disposed on an inner peripheral surface so as to cover the inner peripheral surface.

In the vacuum degassing apparatus for molten glass according to the present invention, the end brick may have an end surface close to the outer wall such that the end surface is flush with the outer side of the outer wall, which extends toward an outer peripheral side of the introduction pipe or the discharge pipe, or the uprising pipe or the downfalling pipe in a radial direction of the introduction pipe or the discharge pipe, or the uprising pipe or the downfalling pipe: and the end surface of the end brick close to the outer wall may be covered by the sealing flange fixed to the outer wall of the vacuum housing.

In the vacuum degassing apparatus for molten glass according to the present invention, the sealing flange may be formed in a dish shape having an outer peripheral edge portion on an outer periphery, and the outer peripheral edge portion may be mounted to the outer wall by a fixing structure.

In the vacuum degassing apparatus for molten glass according to the present invention, the extension pipe may have a backup flange formed at a position closer to the base end portion than the sealing flange, and the end surface of the end brick close to the outer wall may be covered by the backup flange.

In the vacuum degassing apparatus for molten glass according to the present invention, the introduction pipe and the discharge pipe, or the uprising pipe and the downfalling pipe may be connected to the vacuum vessel in a vertical direction.

In the vacuum degassing apparatus for molten glass according to the present invention, the extension pipe may be brought into contact with either a lower end of the introduction pipe as the upstream end of the introduction pipe or a lower end of the discharge pipe as the downstream end of the discharge pipe.

The present invention provides an apparatus for producing glass products, which includes a glass melting furnace, the vacuum degassing apparatus, a forming device for forming molten glass subjected to vacuum-degassing, and an annealing device for annealing the formed glass.

The present invention provides a process for producing glass products, which includes melting for preparing molten glass; vacuum-degassing the molten glass by the vacuum degassing apparatus; forming the molten glass subjected to the vacuum-degassing; and annealing the formed glass.

Advantageous Effects of Invention

In accordance with the present invention, the fixing structure which has fixed the sealing flange of an extension pipe made of heat-resisting metal to the outer wall of the vacuum housing can be released to remove the extension pipe which has been used, being immersed in the molten glass. Accordingly, the vacuum degassing apparatus is provided so to have a joint structure which have a long durability so as to correspond to the original lifetime of the bricks constituting a vacuum vessel, an introduction pipe and a discharge pipe by adopting measures where an extension pipe, which is likely to have a shorter lifetime than the vacuum vessel, the introduction pipe and the discharge pipe constituted by bricks so as to have an improved durability in response to the lifetime of the bricks, can be easily exchanged for a different one.

Further, in accordance with the present invention, when the vacuum degree is required to be significantly modified or adjusted according to a difference of the kind of glass, an extension pipe can be exchanged for a new long extension pipe with the result that the vacuum degassing apparatus can be quickly modified to be applicable to a wider range of vacuum degree without modifying the vacuum vessel per se.

Furthermore, in accordance with the present invention, it is possible to produce high quality glass products with bubbles minimized therein for a long period of time by using the vacuum degassing apparatus having an excellent durability according to the present invention.

DESCRIPTION OF EMBODIMENTS

First Embodiment:

Now, an embodiment of the vacuum degassing apparatus including a joint structure for jointing an extension pipe with an introduction pipe or a discharge pipe according to the present invention will be described in reference to the accompanying drawings. It should be noted that the present invention is not limited to the embodiments described below.

Figure 1:
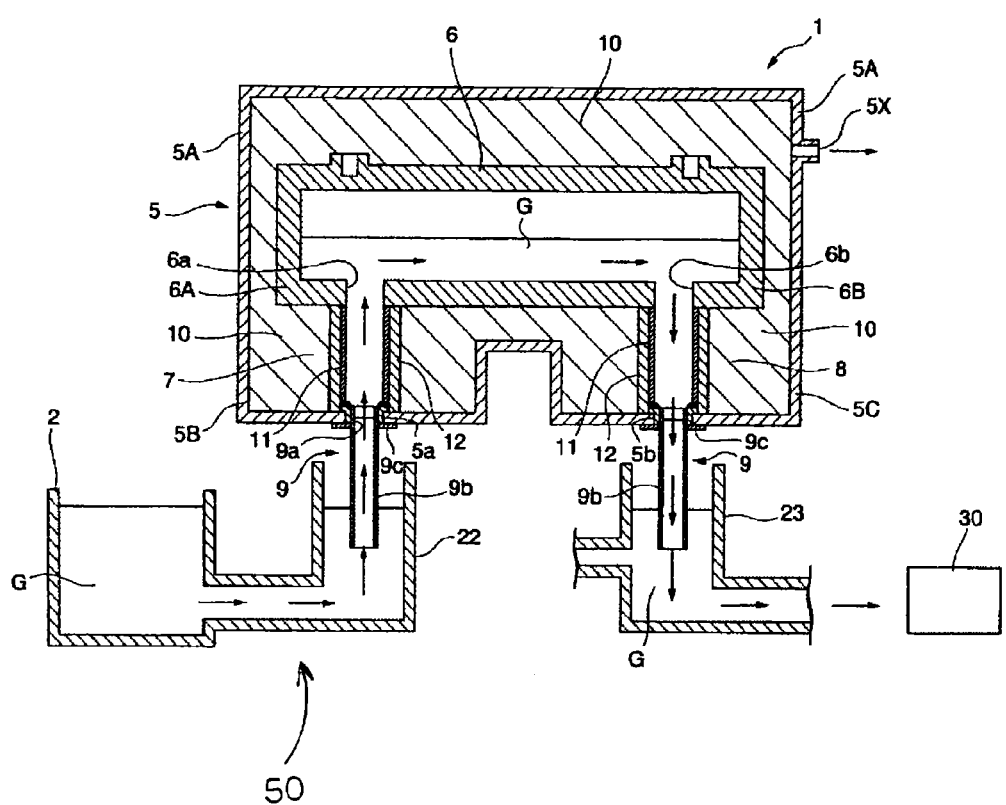
FIG. 1 is a schematic structural view showing an example of the vacuum degassing apparatus according to a first embodiment of the present invention.

The vacuum degassing apparatus 1 shown in FIG. 1 is used in a process for vacuum-degassing molten glass G (molten material) having a high temperature supplied from a melting tank 2 and continuously supplying the degassed molten glass to a forming apparatus 30 in a subsequent step.

The vacuum degassing apparatus 1 according to this embodiment includes a vacuum housing 5 constituted by an outer wall made of metal, such as stainless steel, the interior of which can be maintained in a reduced pressure state at a time of operation. The vacuum housing 5 has a vacuum vessel 6 horizontally accommodated therein.

The vacuum housing 5 is disposed so as to ensure airtightness in the vacuum vessel 6 and is formed in a substantially triumphal gateway shape. Although there is no particular limitation to the material and the structure of the vacuum housing 5 as long as the vacuum housing can provide required airtightness and strength to the vacuum vessel 6, the vacuum housing is constituted by the outer wall 5A made of, preferably, refractory metal, in particular stainless steel. The vacuum housing 5 is configured such that the interior of the vacuum vessel 6 can be maintained in a certain reduced pressure state, such as a reduced pressure state having about 1/20 to 1/3 atmospheric pressure, by being subjected to vacuuming through an exhaust port 5x by a vacuum pump etc. (not shown) from outside.

To a lower face of one end side 6A (a left end side in FIG. 1, i.e. upstream side) of a bottom portion of the vacuum vessel 6 accommodated in the vacuum housing 5, an introduction pipe (i.e. uprising pipe) 7 is connected via an introduction port 6a so as to vertically extend, and to a lower face of the other end side 6B (a right end side in FIG. 1, i.e. downstream side) of the bottom portion, a discharge pipe (i.e. downfalling pipe) 8 is connected via an exit port 6b so as to vertically extend. The uprising pipe 7 and the downfalling pipe 8 are disposed so as to communicate with outside through an insertion port 5a formed in the outer wall 5A forming the bottom portion of the vacuum housing 5 and through an insertion port 5b formed in the outer wall 5A forming the bottom portion of the vacuum housing 5, respectively. The uprising pipe 7 has a lower end portion jointed to an extension pipe 9, which passes through the insertion port 5a in the outer wall 5A and extends downward, and the downfalling pipe 8 has a lower end portion jointed to an extension pipe 9, which passes through the insertion port 5b in the outer wall 5A and extends downward.

In the Description, explanation will be made such that a pipe, which is disposed upstream of the vacuum vessel in order to introduce molten glass into the vacuum vessel, is called an introduction pipe, irrespectively of its extending direction, and, in particular, an introduction pipe, which is disposed in order that the molten glass flows vertically and upward from an upstream pit of a melting tank toward the vacuum vessel 6, is called an uprising pipe. Explanation will be also made such that a pipe, which is disposed downstream of the vacuum vessel in order to discharge molten glass from the vacuum vessel, is called a discharge pipe, irrespectively of its extending direction, and, in particular, a discharge pipe, which is disposed in order that molten glass flows vertically and downward from the melting tank toward a downstream pit, is particularly called a downfalling pipe.

In the Description, the wording "upstream" means an upstream side in the flowing direction of the molten glass G flowing through the vacuum vessel 6 in the vacuum degassing apparatus 1, i.e. a side where the melting tank is disposed, while the wording "downstream" means a downstream side in the flowing direction of the molten glass G flowing through the vacuum vessel 6 in the vacuum degassing apparatus 1, i.e. a side where the forming apparatus is disposed.

The vacuum housing 5 has a heat-insulating material 10 made of e.g. heat-insulating bricks, disposed around each of the vacuum vessel 6, the uprising pipe 7 and the downfalling pipe 8 therein such that the vacuum vessel 6, the uprising pipe 7 and the downfalling pipe 8 have outer sides surrounded by the heat-insulating material 10.

In the vacuum degassing apparatus 1, each of the vacuum vessel 6, the uprising pipe 7 and the downfalling pipe 8 has a double-layer structure on a side in contact with the molten glass G such that a plurality of outer armoring bricks are disposed outside a plurality of inner armoring bricks, although the double-layer structure is not clearly depicted in FIG. 1. In the embodiment shown in FIG. 1, the uprising pipe 7 and the downfalling pipe 8 are respectively disposed in leg portions 5B and 5C forming the outer wall of the vacuum housing 5 formed in a substantially triumphal gateway shape.

Figure 2A:
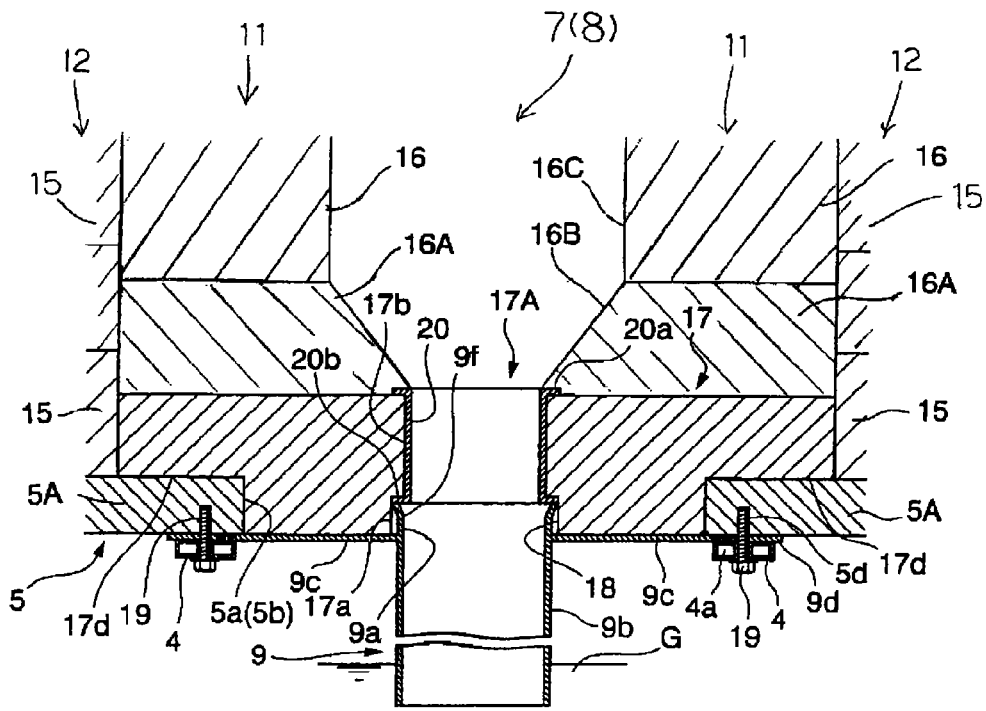
FIGS. 2(A) to 2(C) are views showing essential parts of a joint structure for jointing an extension pipe with an introduction pipe or a discharge pipe according to the first embodiment of the present invention, FIG. 2(A) being a cross-sectional view of the entire essential parts, FIG. 2(B) being a cross-sectional view showing a positional relationship between a base end portion of the extension pipe and a through hole in an end brick, and FIG. 2(C) being a cross-sectional view showing a fixing structure for an outer peripheral edge portion of a sealing flange.

Each of the uprising pipe 7 and the downfalling pipe 8 shown in FIG. 2(A) is configured in a double-layer structure such that a plurality of bricks are assembled. In one example, each of the uprising pipe and the downfalling pipe is configured to have an inner peripheral portion 11 in direct contact with the molten glass G and an outer peripheral portion 12 disposed on an outer side of the inner peripheral portion such that the inner peripheral portion is constituted by assembling a plurality of inner armoring bricks having an excellent corrosion resistance, such as fused cast bricks, and the outer peripheral portion is constituted by assembling a plurality of outer armoring bricks having an excellent heat resistance, such as refractory bricks. Although the vacuum vessel 6 is also constituted by a plurality of inner armoring bricks and a plurality of outer armoring bricks as in the uprising pipe 7 and the downfalling pipe 8, the vacuum vessel is shown to be as if it has a single layer structure for simplification.

When each of the vacuum vessel 6, the uprising pipe 7 and the downfalling pipe 8 is constituted by bricks, it is possible to make the vacuum vessel 6 larger because the use of bricks can reduce the construction cost in comparison with a case where each of the vacuum vessel, the uprising pipe and the downfalling pipe is constituted by a platinum alloy and because it is possible to design the respective bricks so as to have a desired thickness and a desired size without constraint.

When a portion of the uprising pipe 7 and the downfalling pipe 8 in contact with the molten glass G is constituted by fused cast bricks, it is possible to maintain the homogeneity of the molten glass.

Although each of the uprising pipe 7 and the downfalling pipe 8 is constituted by assembling such bricks in this embodiment, there is no limitation to how to assemble the bricks. For example, fused cast bricks having a small rectangular parallelepiped shape may be piled up, and a joint sealing material may be filled into joints between adjacent bricks to build a cylindrical pipe having a certain length as each of the uprising pipe and the downfalling pipe. Or, cylindrical bricks, which have been casted in a cylindrical shape etc., may be piled up in a row, and a joint sealing material may be filled into joints between adjacent bricks to build a cylindrical pipe having a certain length as each of the uprising pipe and the downfalling pipe.

There is no particular limitation to the fused cast bricks as long as the bricks are bricks that have been produced by subjecting a refractory material to electric melting and then casting the molten refractory material into a certain shape. Any conventional fused cast bricks may be used as the fused cast bricks. Among them, alumina-based fused cast refractories, zirconia-based fused cast refractories, AZS($Al_2O_3$—$ZrO_2$—$SiO_2$)— based fused cast refractories and so no may be listed in terms of high corrosion resistance and minimal bubble generation from glass melt. More specifically, "Marsnite (MB)", "ZB-X950" and "Zirconite (ZB)" (which are all manufactured by AGC Ceramics Co., Ltd.) may be used.

The outer armoring bricks disposed outside the inner armoring bricks may be conventional bricks having an excellent heat insulation. There is no particular limitation to the outer armoring bricks.

Figure 2B:
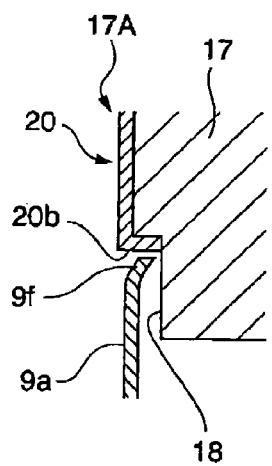
Figure 2C:
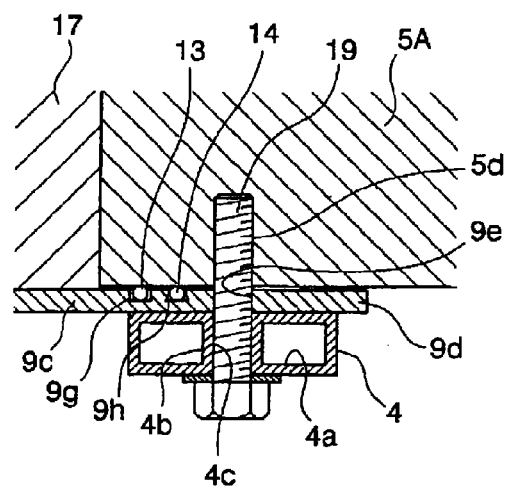

The uprising pipe 7 and the downfalling pipe 8, which are configured to have a double-layer structure by use of the above-mentioned inner armoring bricks and outer armoring bricks, have the lower end portions jointed to the outer wall 5A forming the vacuum housing 5, respectively, and the joint portion between the lower end portions and the outer wall have a cross-sectional structure which is shown in detail in FIGS. 2(A) to 2(C). The structure of the joint portion between the uprising pipe 7 and the outer wall 5A, and the structure of the joint portion between the downfalling pipe 8 and the outer wall 5A are collectively shown in FIGS. 2(A) to 2(C) because both structures are the same as each other.

As shown in FIGS. 2(A) to 2(C), the outer peripheral portions 12 of the uprising pipe 7 and the downfalling pipe 8 are built by assembling the plurality of outer armoring bricks 15, and the inner peripheral portions 11 of the uprising pipe 7 and the downfalling pipe 8 are built by assembling the plurality of inner armoring bricks 16. It should be noted that each of the uprising pipe 7 and the downfalling pipe 8 has a lower end (one end) provided with an end brick 17, which has a through hole 17A formed in a central portion thereof. It is preferred in terms of reducing the number of joints that the end brick have an integral structure or be constituted by a minimum number of bricks. The through hole 17A has a lower end serving as a lower end opening (opening in one end) 18 of the uprising pipe 7 or the downfalling pipe 8 as well. The lower end opening 18 receives a base end portion (upper portion) 9a of a corresponding extension pipe 9. An inner armoring brick 16A, which is disposed on the end brick 17 so as to form a first layer, has a tapered through hole 16B formed in a central portion so as to be downwardly constricted such that the tapered through hole has a constricted inner diameter in comparison with through holes 16C formed in other inner armoring bricks 16 located at a higher level than the end brick 17. Thus, the flow path for the molten glass G is formed so as to be constricted at the through hole 16B and merge into the through hole 17A in the end brick 17.

The end brick 17 is disposed as a part forming the inner armoring bricks 16 disposed outside the outer armoring bricks and is made of a fused cast brick described above.

In the through hole 17A of the end brick 17, the lower end opening 18 is formed as a large diameter portion 17a, and a portion of the through hole 17A above the lower end opening 18 is formed as a small diameter portion 17b such that the large diameter portion 17a has a slightly larger inner diameter than the small diameter portion 17b. In this embodiment, the large diameter portion 17a has a smaller height than the small diameter portion 17b such that the height of the large diameter portion 17a is about a fraction of the entire height (thickness) of the end brick.

The end brick 17 has a peripheral stepped portion 17d formed in an outer peripheral portion of a bottom face, and the outer wall 5A of the vacuum housing 5 extends so as to cover the peripheral stepped portion 17d. Outer armoring bricks 15 that are located at the lowest position among the plurality of outer armoring bricks 15 thus assembled are disposed on a portion of the outer wall 5A outside the peripheral stepped portion 17d. That is to say, on a lower end side of the end bricks 17, the insertion port 5a or the insertion port 5b formed in the outer wall 5A of the vacuum housing 5 is aligned with the peripheral stepped portion 17d such that the end brick 17 and the outer armoring bricks 15 adjacent the end brick are supported by the outer wall 5A of the vacuum housing 5. In other words, both of the lower end portion of the uprising pipe 7 and the lower end portion of the downfalling pipe 8 are supported by the outer wall 5A.

Each of the end bricks 17 according to this embodiment is one example, and each of the end bricks 17 may be, for example, configured so as to be divided in a horizontal direction on an outer peripheral side in contact with the outer wall 5A.

The extension pipe 9 is constituted by the base end portion 9a received into the lower end opening 18 of the uprising pipe 7 or the downfalling pipe 8, a cylindrical body portion 9b extending downward from the base end portion under the uprising pipe 7 or the downfalling pipe 8, and a circular disc shaped sealing flange 9c extending from an outer peripheral position of an upper end of the body portion 9b, i.e. extending from an outer peripheral position of a lower end of the base end portion 9a. The sealing flange 9c is configured to extend from the outer peripheral position of the body portion 9b toward a direction orthogonal to the center line of the body portion 9b and to have an outer peripheral edge portion 9d reaching the outer wall 5A of the vacuum housing 5. In other words, the sealing flange 9c extends so as to conceal the through hole 5a or the through hole 5b formed in the outer wall 5A of the vacuum housing 5.

In the sealing flange 9c shown in FIG. 2(C), the outer peripheral edge portion 9d is formed in a thick ring shape and has a plurality of through apertures 9e formed equidistantly in a circumferential direction. The outer wall 5A of the vacuum housing 5 has tapped holes 5d formed therein so as to correspond to the positions where the through apertures 9e are formed. The tapped holes 5d do not need to be directly formed in the outer wall 5A and may be constituted by tapped holes formed in e.g. a ring member integrally mounted to the outer wall 5A by welding etc.

In the sealing flange 9c, the thick outer peripheral edge portion 9d may be made of a Ni alloy or another heat-resisting metal material or may be entirely made of precious metal, such as a platinum alloy. Although the sealing flange 9c needs to have an inner peripheral side having a sufficient heat resistance to the molten glass G at a high temperature (high temperature of 1,200 to 1,400° C.) since the inner peripheral side is close to the molten glass G at a high temperature, the outer peripheral portion 9d of the sealing flange may be made of an heat-resisting alloy other than precious metal, such as a Ni alloy because it is sufficient for the outer peripheral portion to have a heat resistance to a lower temperature range.

The sealing flange 9c is screwed to the outer wall 5A by bolt 19 passing through the through apertures 9e formed in the outer peripheral edge portion 9d of the sealing flange 9c and screwed into the tapped holes 5d in the outer wall 5A. It is possible to remove the bolts 19 from the outer wall 5A by unscrewing the bolts 19. In this embodiment, the outer wall 5A with the tapped holes 5d and the bolts 19 to be screwed into the tapped holes 5d constitute a fixing structure for the sealing flange 9c, in other words, a fixing structure for the extension pipe 9.

It is needless to say that the fixing structure for the extension pipe 9 is not limited to the fixing by the bolts 19 and that it is acceptable to adopt a structure like an ISO ferrule union joint.

In the sealing flange 9c according to this embodiment, the outer peripheral edge portion 9d has circumferential grooves 9g and 9h formed in a concentric pattern on an upper inner side, the circumferential groove 9g close to the inner peripheral side has a heat-resisting sealing material 13, such as a metal O-ring, inserted thereinto, and the circumferential groove 9h closer to an outer peripheral side of the sealing flange than the circumferential groove 9g has a sealing material 14, such as a rubber O-ring, inserted thereinto. These sealing materials 13 and 14 are disposed to be interposed between the outer peripheral edge portion 9d and the outer wall 5A in order to airtightly seal the contact portion therebetween when the sealing flange 9c is bolted to the outer wall 5A.

The circumferential groove 9h with the sealing material 14 housed therein may be trapezoidal in section. The reason why the circumferential groove 9h is formed in such a shape is that the sealing material 14 is difficult to get out from the circumferential groove 9h by being constrained in the circumferential groove 9h when removing the sealing flange 9c. It is, however, not essential that the circumferential groove 9h be trapezoidal in section. When the sealing material 14 is made of a resin material, such as plastic rubber, it is likely that the sealing material 14 cannot be removed because having seized to the outer wall 5A. When the circumferential groove 9h is trapezoidal in section to prevent the sealing material 14 from coming out, it is possible to easily remove the sealing material 14 from the outer wall 5A for replacement of the extension pipe 9 because the sealing material 14 is removed from the outer wall 5A along with the sealing flange 9c by removing the sealing flange 9c.

In the structure according to this embodiment, there is disposed a cooling jacket 4 which is constituted by an annular pipe so as to have contact with the outer peripheral edge portion 9d of the sealing flange 9c. The cooling jacket 4 has a hollow structure with a flow passage 4a formed to flow a refrigerant therein. The flow passage 4a of the cooling jacket 4 is connected to a refrigerant supply source via piping, although being not shown in FIGS. 2(A) to (C) for simplification. The refrigerant, such as water, can be supplied from the refrigerant supply source into the flow passage 4a via piping, and the refrigerant can be returned to the refrigerant supply source via piping for circulation, whereby it is possible to cool the sealing materials 13 and 14 and surrounding portions thereof. The cooling jacket 4 has bolt receiving portions 4c formed therein so as to be surrounded by partition wall 4b in order not to block the flow passage 4a at positions where the bolts 19 pass through.

The extension pipe 9 has an outwardly (i.e. trumpet-shaped) expanded portion 9f formed on an upper end of the base end portion 9a, and the expanded portion 9f is located in the deepest area of the lower end opening 18 of the end brick 17, in other words, in the deepest area of the large diameter portion 17a. The end brick 17 has a cylindrical protection member 20 inserted into the small diameter portion 17b so as to cover almost the entire inner peripheral side of the small diameter portion 17b. The protection member 20 is made of precious metal having a heat resistance, such as platinum or a platinum alloy, has an upper flange 20a formed at an upper end so as to expand into a peripheral portion of the lower end opening of the through hole 17A and has a lower flange 20b formed in an outwardly expanded shape so as to extend from the small diameter portion 17b toward the large diameter portion 17a.

The lower flange 20b of the protection member 20 is located in the deepest area of the large diameter portion 17a of the end brick 17, and the expanded portion 9f of the upper end of the extension pipe 9 is located so as to be adjacent to and under the lower flange 20b.

The outer diameter of the lower flange 20b of the protection member 20 and the outer diameter of the expanded portion 9f of the extension pipe 9 are determined so as to be slightly smaller than the inner diameter of the lower end opening 18 of the end brick 17. The lower flange 20b formed on the protection member 20 has an outer peripheral edge located adjacent to an outer peripheral edge of the expanded portion 9f formed on the extension pipe 9.

The distance between the outer peripheral edge of the lower flange 20b and the outer peripheral edge of the expanded portion 9f is preferably determined to be capable of sealing the molten glass G in a close contact portion where the protection member 20 and the extension pipe 9 are thermally expanded in their length directions to bring the outer peripheral edge of the lower flange 20b and the outer peripheral edge of the expanded portion 9f close to and in close contact to each other when the molten glass G at a high temperature is brought into contact with the protection member 20 and the extension pipe 9. By adopting the above-mentioned structure, the molten glass G that flows in the protection member 20 and the extension pipe 9 can be prevented from coming around into the gap between the protection member 20 and the small diameter portion 17b and the gap between the extension pipe 9 and the large diameter portion 17a. When the molten glass G at a high temperature is brought into contact with the protection member 20 and the extension pipe 9, the lower flange 20b and the expanded portion 9f can be brought into contact with each other to provide an excellent sealing effect so as to prevent the molten glass G from coming around as described above since the precious metal, such as a platinum alloy, forming each of the expanded portion 9f and the lower flange 20b is slightly softened.

In the vacuum degassing apparatus 1 according to this embodiment, the extension pipe 9 has a lower end portion extending downward under a portion of the vacuum housing 5 with the uprising pipe 7, inserted into an open end of the upstream pit 22 connected to the melting tank 2 and immersed into the molten glass G in the upstream pit 22. The extension pipe 9 has a lower end portion extending downward under a portion of the vacuum housing 5 with the downfalling pipe 8, immersed into an open end of a downstream pit 23 and immersed into the molten glass G in the downstream pit 23. The glass forming apparatus is connected to a downstream side of the downstream pit 23 such that the molten glass G can be formed in a desired shape by the forming apparatus 30 after being degassed by the vacuum degassing apparatus 1.

In the vacuum degassing apparatus 1, each of the vacuum vessel 6, the uprising pipe 7 and the downfalling pipe 8 is made of bricks, and fused cast bricks, which are excellent in corrosion resistance to molten glass, are disposed on the inner sides of the vacuum vessel, the uprising pipe and the downfalling pipe in contact with the molten glass G. Thus, the vacuum degassing apparatus can be provided at low cost and have a longer lifetime in comparison with a case where the vacuum vessel, the uprising pipe and the downfalling pipe are made of heat-resisting metal, such as platinum.

The vacuum degassing apparatus 1 can have an excellent degassing effect in the vacuum vessel 6 since the molten glass G produced in the melting tank 2 is exposed to a reduced pressure state by being sucked and introduced into the vacuum vessel 6 from the upstream pit 22 through the extension pipe 9 and the uprising pipe 7. Further, it is possible to produce glass products in a desired shape by discharging the degassed molten glass G into the downstream pit 23 through the downfalling pipe 8 and the extension pipe 9 and forwarding the molten glass from the downstream pit 23 to the forming apparatus 30 for formation.

When the vacuum degassing apparatus 1 carries out continuous vacuum degassing treatment of molten glass G for a long period of time, it would be possible that the generation of a heterogeneous basis material or the inclusion of a foreign substance, or a change in the composition of molten glass G to be produced could cause an extension pipe 9 to be subjected to unexpected deterioration such that the extension pipe is damaged. In such a case, it is necessary to exchange the damaged extension pipe for a new one.

In order to exchange the damaged extension pipe 9 for a new one, the molten glass G housed in the vacuum vessel 6 is evacuated into the upstream pit 22 or the downstream pit 23 such that the molten glass having a high temperature is removed from the uprising pipe 7, the downfalling pipe 8 and the extension pipes 9 and 9. After that, when the plurality of bolts that have mounted the sealing flange 9c of the damaged extension pipe at its outer peripheral portion are removed from the ouster wall 5A, the structure for fixing the extension pipe 9 can be released to remove the damaged extension pipe 9 from the outer wall 5A and the end brick 17.

If the vacuum vessel 6, the uprising pipe 7 and the downfalling pipe 8 are cooled to normal temperature in their entireties, the bricks constituting these members are damaged. For this reason, it is preferred that the damaged extension pipe 9 be exchanged for a new one as described below while heated air is additionally fed into the vacuum vessel 6, the uprising pipe 7 and the downfalling pipe 8 by e.g. a burner to keep the bricks constituting these members in such a temperature state that the bricks constituting these members are prevented from being damaged.

When the molten glass G flows through the uprising pipe 7, the downfalling pipe 8 and the respective extension pipes 9 during vacuum degassing treatment, a slight amount of the molten glass G exudes from a base end side of an extension pipe 9 toward the opening 18 around the base end side and comes around up to an upper side of the sealing flange 9c of the extension pipe in some cases. In such cases, when the molten glass G is evacuated from the uprising pipe 7, the downfalling pipe 8 and the extension pipes 9 and 9, agglomerate of the molten glass G could be produced between the sealing flange 9c and the end brick 17, causing the sealing flange 9c and the end brick 17 to be fixed through the glass agglomerate. Although the protection members 20 are not essential, a butt joint structure constituted by the lower flange 20b of each protection member 20 and the expanded portion 9f of each extension pipe 9 can seal the molten glass G to some degree. The sealing by such a butt joint structure is, however, incomplete, and a small amount of the molten glass G leaks in some cases. There is no trouble as long as the leakage of the molten glass is small.

In a case where an attempt is made to remove the damaged extension pipe 9 subjected to the above-mentioned state, when the glass agglomerate on the upper side of the sealing flange 9c is heated and molten by use of a heating device, such as a burner, followed by dragging down the sealing flange 9c, it is possible to remove the extension pipe 9 since the sealing flange 9c is separated from the end brick 17 or the outer wall 5A.

When the sealing flange 9c is dragged down, being heated, it is preferred that the outer peripheral edge portion 9d of the sealing flange 9c be set free by removal of the bolts 19, that the outer peripheral edge portion 9d be forcibly dragged down by use of a tool, such as a crowbar, and that an object, such as a refractory, be placed into between the outer peripheral edge portion 9d of the sealing flange 9c and the outer wall 5A so as to apply such a force to push down an outer peripheral edge side of the sealing flange 9c. When heating by use of e.g. a burner, is initiated in the above-mentioned state, it is possible to the extension pipe 9 effortlessly since the sealing flange 9c comes free from the end brick 17 by itself when the glass agglomerate that has fixed a lower side of the end brick 17 and the upper side of the sealing flange 9c is molten.

When the extension pipe 9 has been removed, it is possible to complete the exchange operation for the extension pipe 9 by using the bolts 19 to fix a similar shape of extension pipe separately produced at the position of the extension pipe 9 before exchange. In order to fix the new extension pipe 9 separately produced, the base end portion 9a of the new extension pipe 9 is pressed into the lower end opening 18 of the end brick 17 to bring the sealing flange 9c of the new extension pipe close to the outer wall 5A, and the bolts 19 are screwed into the tapped holes 5d formed in the outer wall 5A, passing through the through apertures 9e formed in the outer peripheral edge portion 9d of the sealing flange 9c.

In order to mount a cooling jacket 4, its corresponding sealing flange 9c is positioned so as to extend on and along a lower side of the outer wall 5A, followed by positioning the cooling jacket 4 along a portion of the outer wall 5A with the tapped holes 5d formed therein, screwing the bolts 19 in the tapped holes 5d through the bolt receiving portions 4c of the cooling jacket 4 and fixing the new extension pipe.

In accordance with the vacuum degassing apparatus of the present invention, the vacuum vessel 6, the uprising pipe 7 and the downfalling pipe 8 constituted by bricks can be continuously employed up to the original lifetime of the bricks since an extension pipe 9 can be easily exchanged for a new extension pipe as needed as described above. Thus, in the vacuum degassing apparatus 1 including the vacuum vessel 6, the uprising pipe 7 and the downfalling pipe 8 constituted by bricks, the lifetime of the vacuum degassing apparatus 1, which has been limited to the lifetime of an extension pipe 9, can be prolonged up to the original lifetime of refractory bricks by exchanging the extension pipe made of heat-resisting metal whenever is needed.

Exchange of an extension pipe 9 is carried out not only for exchange of a damaged extension pipe 9 but also for exchange of an extension pipe for the purpose of widening the applicability of the vacuum degassing apparatus 1.

For example, an extension pipe 9 having a cylindrical body portion 9b can be exchanged for a new extension pipe having a different length. In the vacuum degassing apparatus 1, a portion of the molten glass G housed in the vacuum vessel 6 is subjected to degassing treatment at a predetermined vacuum level by depressurizing the inside of the vacuum degassing apparatus, and the vacuum level range applied to the degassing treatment subtly varies on the kind of glass. In other words, the molten glass G has different degrees of bubble generation according to its composition or temperature. For example, color glass and colorless glass have different vacuum levels for ideal degassing.

When designing the vacuum degassing apparatus 1, the vacuum degassing apparatus is usually designed so as to cope with a change in the set value of the vacuum degree, which is modified according to the kind of the molten glass G.

In the vacuum degassing apparatus 1 in a substantially triumphal gateway shape shown in FIG. 1, the liquid level of the molten glass G vertically varies according to the pressure in the vacuum vessel 6. For example, when the pressure in the vacuum vessel 6 becomes extremely low, the liquid level of the molten glass G rises in the vacuum vessel 6. In other words, the liquid level of the molten glass G is brought closer to the ceiling of the vacuum vessel 6. For this reason, the position of the entire vacuum vessel 6 needs to be changed when being subjected to a certain vacuum level or higher.

When the extension pipes 9 are exchanged for longer extension pipes 9 so as to change the position of the vacuum vessel 6 to a higher position than usual as one of the measures to solve the above-mentioned problem, the vacuum degassing apparatus can be configured so as to prevent the liquid level of the molten glass G from being easily brought in contact with the ceiling of the vacuum vessel 6 even if the degree of the vacuum level in the vacuum vessel 6 is changed in a wider range than usual.

Even when the vacuum vessel 6 is designed at first so as to have a limited range of vacuum degree expected at a time of producing the vacuum vessel, the vacuum vessel needs to be used at a later stage for producing new molten glass requiring a higher degree of vacuum level in some cases. In such cases, the extension pipes 9 and 9 can be exchanged for new longer pipes, allowing the vacuum degassing apparatus 1 to be applicable to a wider range of vacuum level without altering the inner structure of the vacuum housing which includes the vacuum vessel 6, the uprising pipe 7 and the downfalling pipe 9. For example, when the vacuum vessel 6 is constituted by bricks, the vacuum vessel is expected to have a long lifetime. Even when new glass developed during the lifetime is desired to be vacuum-degassed at a lower reduced pressure, the vacuum degassing apparatus 1 has an advantage of being capable of coping with such a requirement by exchanging the extension pipes 9 with suitable ones without the entire vacuum degassing apparatus 1 being rebuilt.

The molten glass G to be vacuum-degassed by using the vacuum degassing apparatus 1 according to this embodiment is not particularly required to have a specific composition. The molten glass may be soda lime silica glass, alkali-free glass, mixed alkali-based glass, borosilicate glass or any other glass. Further, the glass products to be produced by the vacuum degassing apparatus is applicable not only to architecture or vehicles but also to any kinds of other applications, such as flat display panels.

Figure 3A:
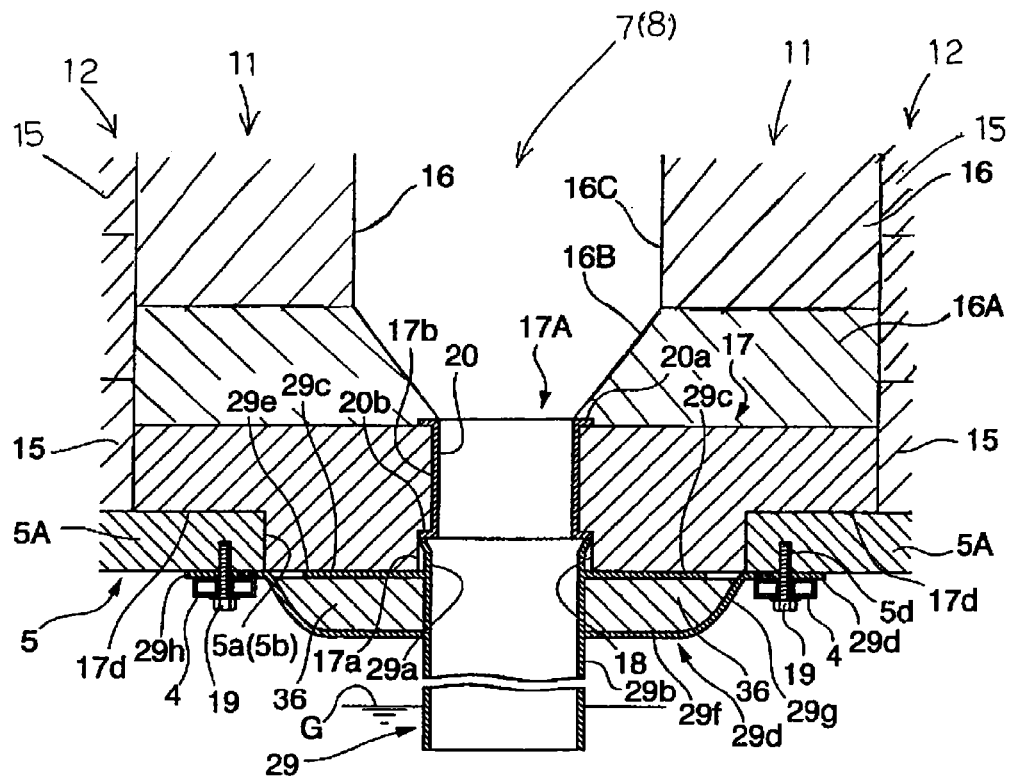
FIGS. 3(A) to 3(C) are views showing essential parts of a joint structure for jointing an extension pipe with an introduction pipe or a discharge pipe according to a second embodiment of the present invention, FIG. 3(A) being a cross-sectional view of the entire essential parts, FIG. 3(B) being a cross-sectional view showing a positional relationship between a base end portion of the extension pipe and a through hole in an end brick, and FIG. 3(C) being a cross-sectional view showing a fixing structure for an outer peripheral edge portion of a sealing flange.
Figure 3B:
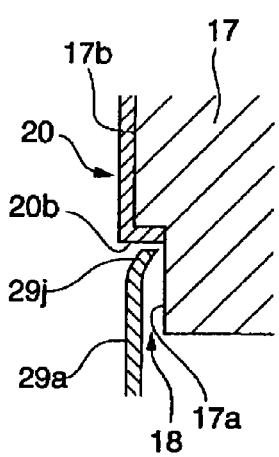
Figure 3C:
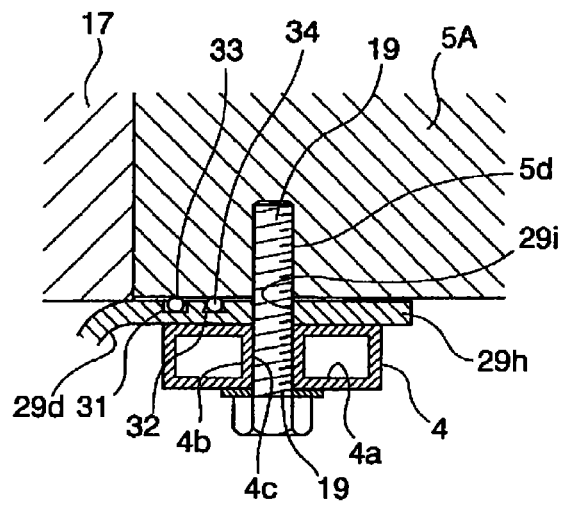

Second Embodiment:

FIGS. 3(A) to 3(C) are enlarged views showing a joint structure for jointing an extension pipe with an introduction pipe or a discharge pipe in the vacuum degassing apparatus including the joint structure for jointing the extension pipe with the introduction pipe or the discharge pipe according to a second embodiment of the present invention.

In the joint structure according to the embodiment shown in FIGS. 3(A) to 3(C), the uprising pipe 7 and the downfalling pipe 8, which are built from bricks, are the same as those in the joint structure according to the previous embodiment. The vacuum vessel, to which the uprising pipe 7 and the downfalling pipe 8 are connected, is the same as the vacuum vessel 6 according to the first embodiment, and the structure of the vacuum housing according to this embodiment is also the same as that of the vacuum housing according to the first embodiment, although being not shown in FIGS. 3(A) to 3(C).

The structure according to this embodiment is different from the structure according to the first embodiment in terms of the structure of the extension pipes.

In the structure according to this embodiment, the extension pipe 29 is substantially constituted by a base end portion 29a received into the lower end opening 18 of the uprising pipe 7 or the downfalling pipe 8, a cylindrical body portion 29b extending and projecting downward from the base end portion 29a under the uprising pipe 7 or the downfalling pipe 8, a circular disc shaped backup flange 29c extending from an outer peripheral position of an upper end of the body portion 29b, i.e. extending from an outer peripheral position of a lower end of the base end portion 29a, and a dish-shaped (i.e. cap-shaped) sealing flange 29d disposed below the backup flange 29c. The backup flange 29c is configured to extend from the outer peripheral position of the body portion 29b toward a direction orthogonal to the center line of the body portion 29b and to have an outer peripheral edge portion 29e so as not to reaching the outer wall 5A of the vacuum housing 5. In other words, the outer peripheral edge portion of the backup flange 29c is sized to be brought into contact with the bottom of an end brick 17 but not to reach the outer wall 5A.

The sealing flange 29d is constituted by an inner peripheral portion 29f formed in a doughnut-shaped sheet, a bent portion 29g extending from the inner peripheral portion so as to bend toward the backup flange 29c, and a ring-shaped outer peripheral edge portion 29h disposed around the outer peripheral edge of the bent portion. In the sealing flange 29d, the inner peripheral portion 29f extends in a direction orthogonal to the center line of the body portion 29b, while the bent portion 29g is formed so as to bend toward the backup flange 29c and extend outward beyond the backup flange 29c. Since the bent portion 29g and the outer peripheral edge portion 29h are disposed outside the inner peripheral portion 29f, the sealing flange 29d is formed in a shallow dish shape as a whole. The sealing flange has a plurality of through apertures 29i formed equidistantly in a circumferential direction along the ring-shaped outer peripheral edge portion 29h.

The sealing flange 29d is sized so as to be capable of aligning the through apertures 29i in the outer peripheral edge portion 29h with the tapped holes 5d in the outer wall 5A in such a state that the base end portion 29a of the extension pipe 29 is received in the lower end opening 18 of the uprising pipe 7 or the lower end opening 18 of the downfalling pipe 8.

Accordingly, the sealing flange 29d is fixed to the outer wall 5A by passing the bolts 19 through the through apertures 29i and screwing the bolts 19 into the tapped holes 5d in the outer wall 5A in the state that the base end portion 29a of the extension pipe 29 is received into the lower end opening 18 of the uprising pipe 7 or the lower end opening 18 of the downfalling pipe 8. This embodiment is the same as the first embodiment in that the fixing structure for the sealing flange 29d, in other words, the fixing structure for the extension pipe 29 is constituted by the outer wall 5A having the tapped holes 5d and the bolts 19 to be screwed into the tapped holes 5d.

In the structure according to this embodiment, the through hole 5a or the through hole 5b formed in the outer wall 5A of the vacuum housing 5 is concealed by the sealing flange 29d. The backup flange 29c is disposed so as to be brought into contact with the bottom of the end brick 17 in such a state that the sealing flange 29d is mounted to the outer wall 5A.

The structure according to the second embodiment is the same as the structure according to the first embodiment in that it is possible to remove the bolts 19 from the outer wall 5A by disengagement of the bolts 19.

The structure according to the second embodiment is the same as the structure according to the first embodiment in that the base end portion 29a of the extension pipe 29 has an upper end formed with an outwardly (trumpet-shape) expanded portion 29j. The structure according to the second embodiment is also the same as the structure according to the first embodiment in that the expanded portion 29j is disposed in the deepest area of the lower opening 18 of the uprising pipe 7 or the downfalling pipe 8, in other words, in the deepest area of a large diameter portion 17a.

The structure according to this embodiment is also the same as the structure according to the first embodiment in that the outer peripheral edge portion 29h of the sealing flange 29d has circumferential grooves 31 and 32 formed on an upper side, that the inner circumferential groove 31 has a heat-resistant sealing material 33, such as a metal O-ring, received therein, and that the outer circumferential groove 32 has a sealing member 34, such as a rubber O-ring, received thereinto.

The structure according to this embodiment is also the same as the structure according to the first embodiment in that a cooling jacket 4 made of an annular pipe is disposed so as to be brought into contact with the outer peripheral edge portion 29h of the sealing flange 29d.

In the structure according to this embodiment, a heat-insulating material 36 is filled into the space between the sealing flange 29d and the backup flange 29c of the extension pipe 29. The heat-insulating material 36 may be constituted by assembling a plurality of small heat-insulating bricks or a castable heat-insulating material.

The backup flange 29c is brought into contact with the bottom of the end brick 17 with the sealing flange 29d being fixed to the outer wall 5A, and the heat-insulating material 36 is disposed under the backup flange 29c, being supported by the sealing flange 29d from underneath. The end brick 17 has a circumferential side supported by the outer wall 5A.

The exchange operation in the structure according to this embodiment is the same as the vacuum degassing apparatus including the structure according to the first embodiment, and explanation of the exchange operation will be omitted.

The extension pipe 29 having the structure shown in FIGS. 3(A) to 3(B) including the dish-shaped sealing flange 29d, and the bent portion 29g can be deformed to absorb thermal expansion when the molten glass G passes through the extension pipe 29 to thermally expand the sealing flange 29d in a radial direction.

With regard to the other advantages, the extension pipe according to this embodiment can have similar advantages to the extension pipe 9 according to the first embodiment stated above.

Figure 4A:
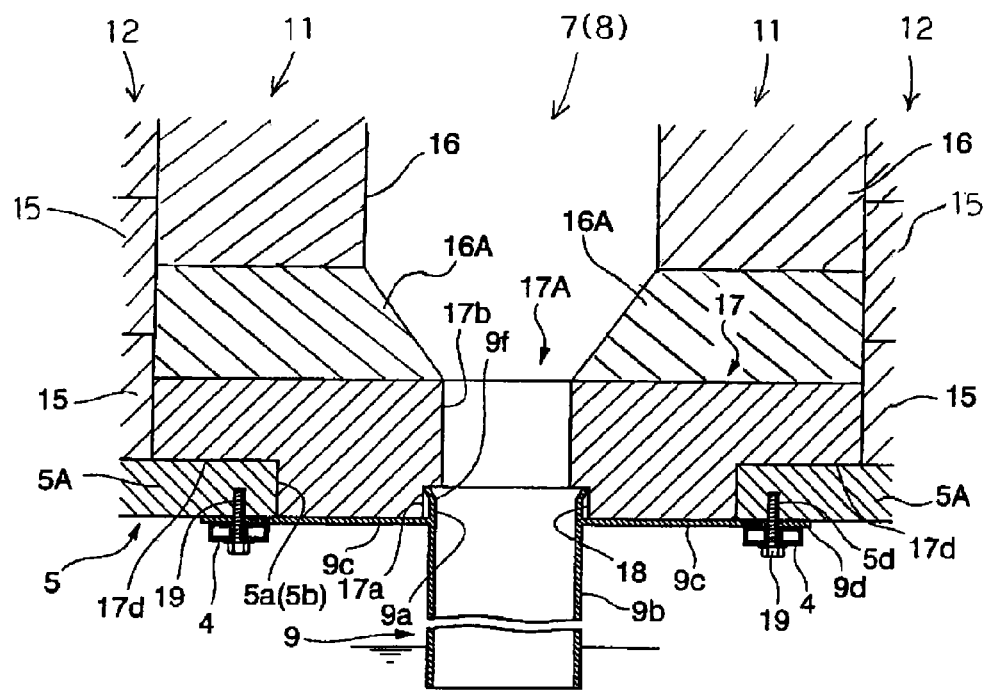
FIGS. 4(A) to 4(C) are views showing essential parts of a joint structure for jointing an extension pipe with an introduction pipe or a discharge pipe according to a third embodiment of the present invention, FIG. 4(A) being a cross-sectional view of the entire essential parts, FIG. 4(B) being a cross-sectional view showing a positional relationship between a base end portion of the extension pipe and a through hole in an end brick, and FIG. 4(C) being a cross-sectional view showing a fixing structure for an outer peripheral edge portion of a sealing flange.
Figure 4B:
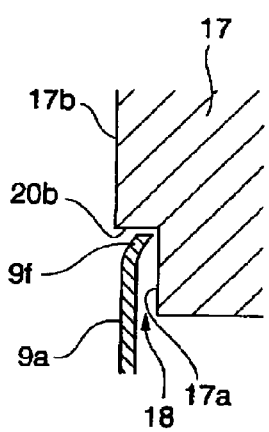
Figure 4C:
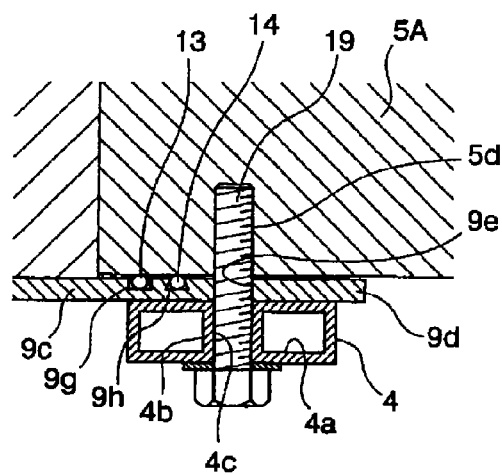

Third Embodiment:

FIGS. 4(A) to 4(C) are enlarged views showing a joint structure for jointing an extension pipe with an introduction pipe or a discharge pipe in the vacuum degassing apparatus including the joint structure for jointing the extension pipe with the introduction pipe or the discharge pipe according to a third embodiment of the present invention.

In the joint structure according to the embodiment shown in FIGS. 4(A) to 4(C), the uprising pipe 7 and the downfalling pipe 8, which are built from bricks, are the same as those in the joint structure according to the previous embodiments. The vacuum vessel according to this embodiment, to which the uprising pipe 7 and the downfalling pipe 8 are connected, is the same as the vacuum vessel 6 according to the first embodiment, and the structure of the vacuum housing according to this embodiment is also the same as that of the vacuum housing according to the first embodiment, although being not shown in FIGS. 4(A) to 4(C). With regard to the elements shown in FIGS. 4(A) to 4(C), the same elements as those in the structure according to the first embodiment will be denoted by the same reference numerals, and explanation of these elements will be omitted.

In the structure according to this embodiment, the protection member 20, which is disposed in the through hole 17A in the end brick 17 in the structure according to the first embodiment, is omitted.

With regard to the other functions and advantages, the structure according to the third embodiment can have the same functions and advantages as the structure according to the first embodiment.

Figure 5A:
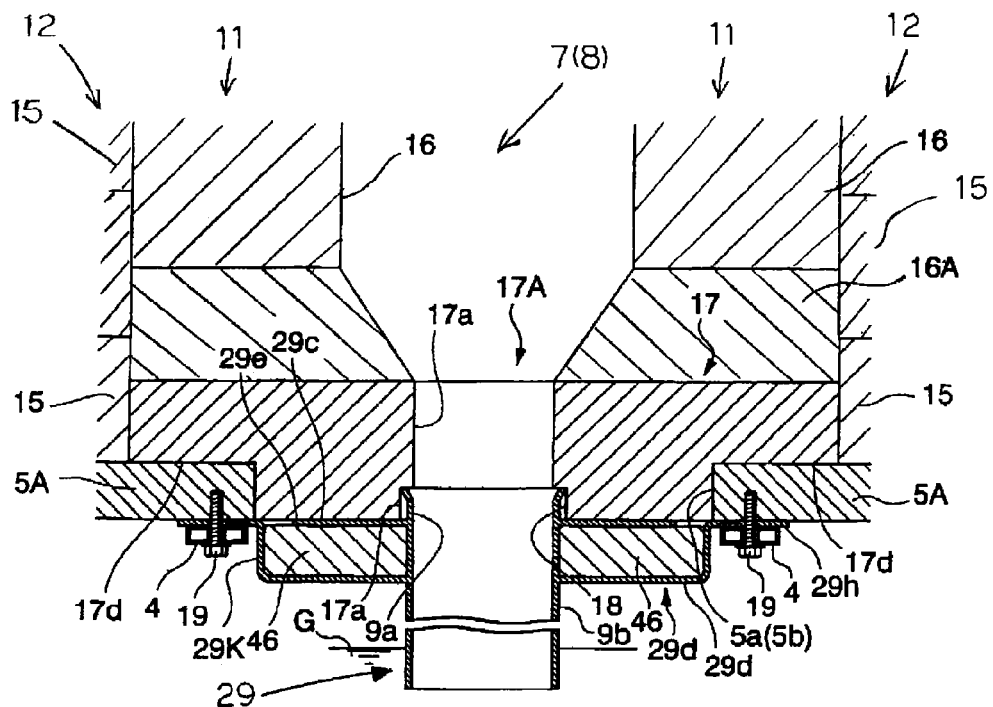
FIGS. 5(A) to 5(C) are views showing essential parts of a joint structure for jointing an extension pipe with an introduction pipe or a discharge pipe according to a fourth embodiment of the present invention, FIG. 5(A) being a cross-sectional view of the entire essential parts, FIG. 5(B) being a cross-sectional view showing a positional relationship between a base end portion of the extension pipe and a through hole in an end brick, and FIG. 5(C) being a cross-sectional view showing a fixing structure for an outer peripheral edge portion of a sealing flange.
Figure 5B:
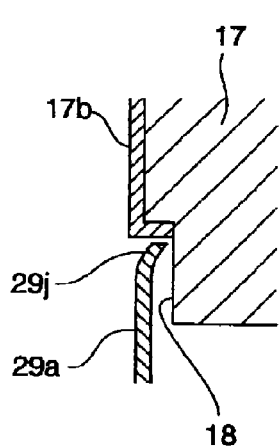
Figure 5C:
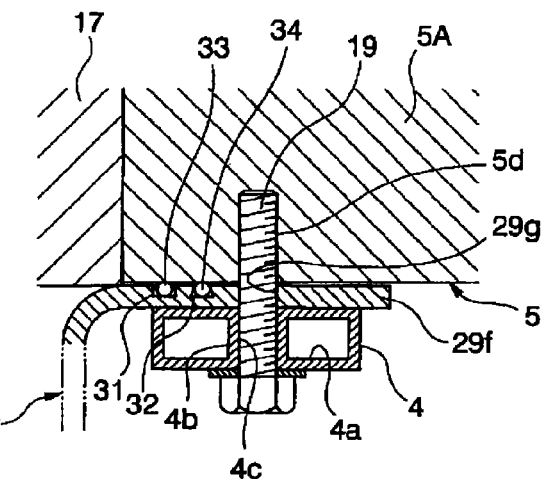

Fourth Embodiment:

FIGS. 5(A) to 5(C) are enlarged views showing a joint structure for jointing an extension pipe with an introduction pipe or a discharge pipe in the vacuum degassing apparatus including the joint structure for jointing the extension pipe with the introduction pipe or the discharge pipe according to a fifth embodiment of the present invention.

In the joint structure according to the embodiment shown in FIGS. 5(A) to 5(C), the uprising pipe 7 and the downfalling pipe 8, which are built from bricks, are the same as those in the joint structure according to the previous embodiments. The vacuum vessel according to this embodiment, to which the uprising pipe 7 and the downfalling pipe 8 are connected, are the same as the vacuum vessel 6 according to the first embodiment, and the structure of the vacuum housing according to this embodiment is also the same as that of the vacuum housing according to the first embodiment, although being not shown in FIGS. 5(A) to 5(C). With regard to the elements shown in FIGS. 5(A) to 5(C), the same elements as those in the structure according to the second embodiment will be denoted by the same reference numerals, and explanation of these elements will be omitted.

In the structure according to this embodiment, the protection member 20, which is disposed in the through hole 17A in the end brick 17 in the structure according to the first embodiment, is omitted.

The structure according to this embodiment is configured such that a sealing flange 29d has an outer peripheral portion bent toward a backup flange 29c so as to have a bent portion 29k bent at an angle close to 90 degrees with respect to an inner peripheral portion 29f with the result that it is easy to place a heat-insulating material 46 into the space between the backup flange 29c and the sealing flange 29d.

When a heat-insulating material 46 made of refractory bricks is placed into the space between the backup flange 29c and the sealing flange 29d, the refractory bricks are placed into the space through a gap between the backup flange 29c and the bent portion 29k. In this case, it is easy to place the heat-insulating material when the bent portion 29k is bent at an angle close to 90 degrees.

An extension pipe 29, which is configured as shown in FIGS. 5(A) to (C), has the sealing flange 29d in a dish shape such that the bent portion 29k can be deformed so as to absorb thermal expansion when the molten glass G passes through the extension pipe 29 to thermally expand the sealing flange 29d in a radial direction.

With regard to the other advantages, the extension pipe according to this embodiment can have similar advantages to the extension pipe 29 according to the second embodiment described above.

Now, an apparatus for producing glass products according to the present invention will be described.

As shown in FIG. 1, the apparatus for producing glass products according to the present invention includes a glass melting furnace 50 having the melting tank 2 for melting glass materials to prepare molten glass, the vacuum degassing apparatus 1 according to the present invention disposed in succession communication with the glass melting furnace 50 so as to remove bubbles in the molten glass, the glass forming apparatus 30 having a forming device for forming the vacuum-degassed molten glass G into desired glass products, and an annealing device for annealing the shaped glass products.

The apparatus for producing glass products according to the present invention is within the range of publicly known technique except that the above-mentioned vacuum degassing apparatus 1 is used.

Figure 6:
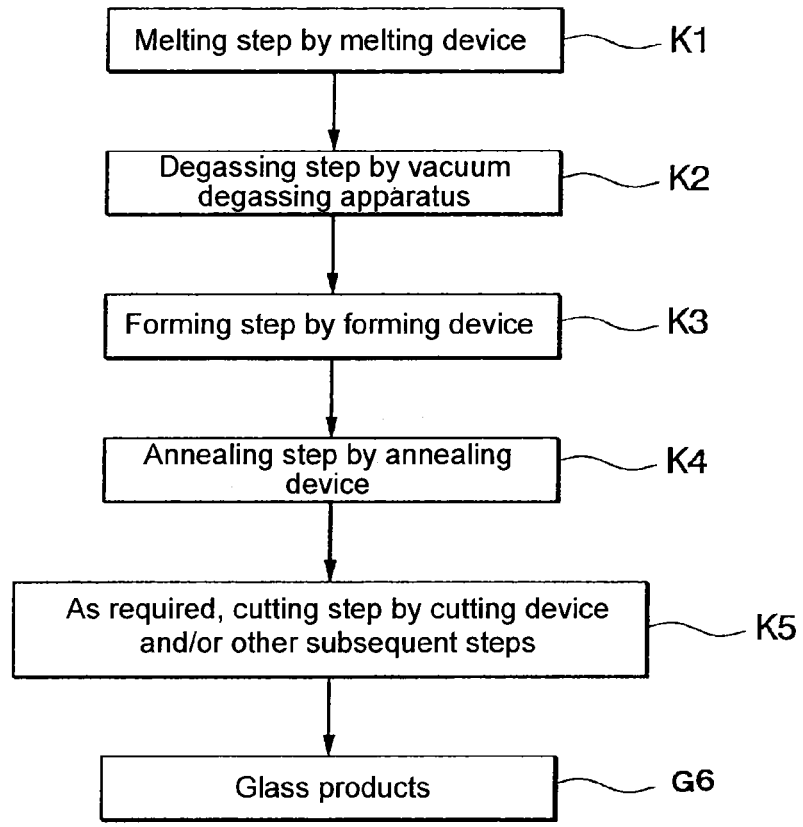
FIG. 6 is a flow chart showing an example of the process for producing glass products according to the present invention.
Figure 7:
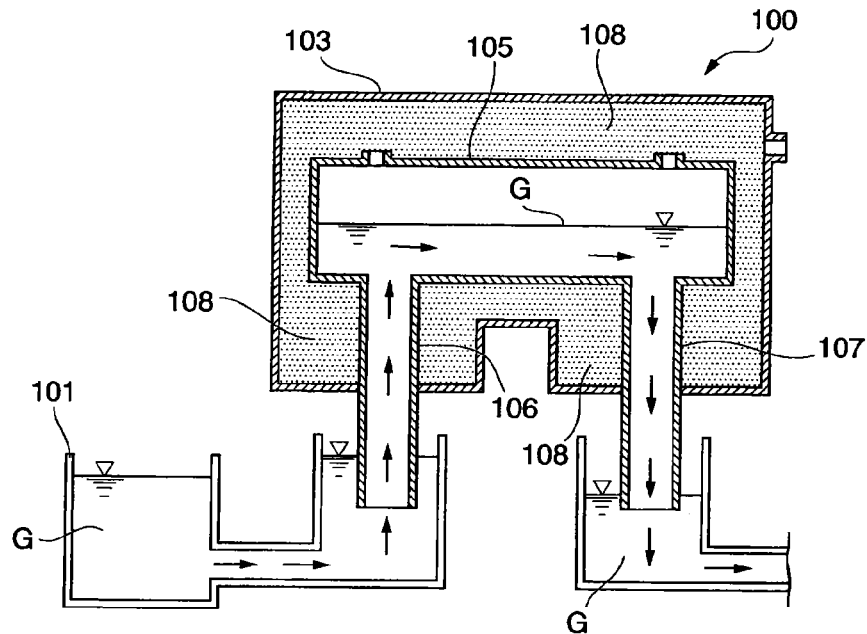
FIG. 7 is a cross-sectional view showing the joint structure for an extension pipe in a conventional vacuum degassing apparatus.
Figure 8:
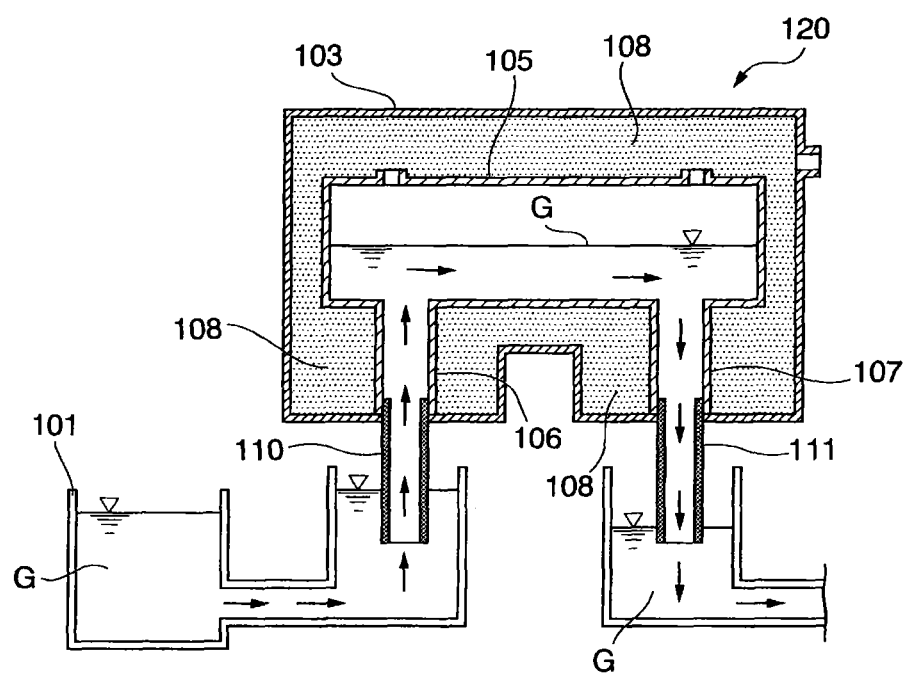
FIG. 8 is a cross-sectional view showing the joint structure for an extension pipe in another conventional vacuum degassing apparatus.

Next, a process for producing glass products according to the present invention will be described. FIG. 6 is a flow chart of an embodiment of the process for producing glass products according to the present invention.

The process for producing glass products according to the present invention is characterized by employing the above-mentioned vacuum degassing apparatus 1. The process for producing glass products according to the present invention is a glass product production process for producing glass products G6 by including, as one example, a melting step K1 of melting glass materials to prepare molten glass in the melting tank 2 at a stage prior to the vacuum degassing apparatus 1, a degassing step K2 of vacuum-degassing the molten glass in the above-mentioned vacuum degassing apparatus 1, a forming step K3 of forming the molten glass in the forming apparatus downstream the above-mentioned vacuum degassing apparatus 1, an annealing step K4 of annealing the molten glass in a subsequent step, and a cutting step K5 of cutting the annealed glass products as needed. The process for producing glass products according to the present invention is carried out in the order of the above-mentioned steps K1 to K5.

The process for producing glass products according to the present invention is within the range of commonly known technique except that the above-identified vacuum degassing apparatus 1 is used. Although FIG. 6 shows the cutting step K5 conducted as needs and other subsequent steps in addition to the melting step K1, the degassing step K2, the forming step K3 and the annealing step K4 that constitute the process for producing glass products according to the present invention, the cutting step K5 or the other subsequent steps may be omitted according to the kind of glass products.

Since high quality molten glass G with bubbles minimized therein can be supplied to the forming apparatus 30 by using the vacuum degassing apparatus 1 according to the present invention to vacuum-degas the molten glass G, glass products, which are formed in a desired shape by the forming apparatus 30, can be high quality glass products with bubbles minimized therein.

When the vacuum degree is required to be significantly modified or adjusted according to a difference of the kind of glass, the use of the vacuum degassing apparatus 1 according to the present invention allows the extension pipes to be exchanged for new long extension pipes with the result that the vacuum degassing apparatus can be quickly modified to be applicable to a wider range of vacuum degree without modifying the vacuum vessel, the uprising pipe and the downfalling pipe.

INDUSTRIAL APPLICABILITY

The technique according to the present invention is widely applicable to the production of architecture glass, vehicle glass, optical glass, medical glass, display glass and other common glass products.

This application is a continuation of PCT Application No. PCT/JP2012/058987, filed on Apr. 2, 2012, which is based upon and claims the benefit of priority from Japanese Patent Application No. 2011-078365 filed on Mar. 31, 2011. The contents of those applications are incorporated herein by reference in its entirety.

REFERENCE SYMBOLS

G: Molten glass (molten material), 1: vacuum degassing apparatus, 2: melting tank, 4: cooling jacket, 5: vacuum housing, 5A: outer wall, 5a and 5b: through holes, 5d: tapped hole, 6: vacuum vessel (vacuum degassing vessel), 7:

introduction pipe (uprising pipe), 8: discharge pipe (downfalling pipe), 9: extension pipe, 9*a*: base end portion, 9*b*: body portion, 9*c*: sealing flange, 9*d*: outer peripheral edge portion, 9*e*: through aperture, 9*f*: expanded portion, 10: heat-insulating material, 11: inner peripheral portion, 12: outer peripheral portion, 13 and 14: sealing material, 15: outer armoring brick, 16 and 16A: inner armoring brick, 17: end brick, 17A: through hole, 17*a*: large diameter portion, 17*b*: small diameter portion, 17*d*: peripheral stepped portion, 18: opening in one end (lower end opening), 19: bolt, 22: upstream pit, 23: downstream pit, 20: protection member, 29: extension pipe, 29*a*: base end portion, 29*c*: backup flange, 29*d*: sealing flange, 29*g*: bent portion, 29*h*: outer peripheral edge portion, 29*j*: expanded portion, 29*k*: bent portion, 29*i*: through apertures, 30: glass forming apparatus, 33 and 34: sealing material, 36 and 46: heat-insulating material, 50: glass melting furnace, K1: melting step, K2: degassing step, K3: forming step, K4: annealing step, K5: cutting step, G6: glass product

What is claimed is:

1. A vacuum degassing apparatus for molten glass, comprising:
   a vacuum housing;
   a vacuum vessel disposed in the vacuum housing such that molten glass is introduced into the vacuum vessel;
   an introduction pipe positioned in the vacuum housing and connected to an upstream side of the vacuum vessel such that the molten glass is introduced into the vacuum vessel;
   a discharge pipe positioned in the vacuum housing and connected to downstream side of the vacuum vessel such that the molten glass is discharged from the vacuum vessel; and
   an extension pipe connected to at least one of an upstream end of the introduction pipe and a downstream end of the discharge pipe and extending through a through hole formed in an outer wall of the vacuum housing,
   wherein the extension pipe is made of heat-resisting metal and has a base end portion formed on one end close to the vacuum vessel, a body portion formed continuous to the base end portion, and a sealing flange extending outward from an outer periphery of the body portion and mounted to the outer wall of the vacuum housing such that the sealing flange is covering the through hole in the outer wall,
   the extension pipe is detachably fixed to the outer side of the outer wall through a fixing structure disposed on of the sealing flange such that the base end portion of the extension pipe is received in an opening formed at the upstream end of the introduction pipe or the downstream end of the discharge pipe, and
   the sealing flange contacts with the outer wall.

2. The apparatus according to claim 1, wherein
   the introduction pipe is an uprising pipe through which the molten glass flows upward, and the discharge pipe is a down falling pipe through which the molten glass flows downward;
   the base end portion is formed on an upper end of the extension pipe, the body portion is formed continuous to the base end portion and extending downward, and the sealing flange is positioned at a lower end of at least one of the uprising pipe and the downfalling pipe; and
   the opening is formed at a lower end of the uprising pipe or a lower end of the downfalling pipe.

3. The apparatus according to claim 2, wherein the uprising pipe is constituted by assembling inner armoring bricks in contact with the molten glass and outer armoring bricks disposed outside the inner armoring bricks in a radial direction of the uprising pipe, the inner armoring bricks comprise at least one end brick at the lower end of the uprising pipe;
   the downfalling pipe is constituted by assembling inner armoring bricks in contact with the molten glass and outer armoring bricks disposed outside the inner armoring bricks in a radial direction of the downfalling pipe, the inner armoring bricks comprise at least one end brick at the lower end of the downfalling pipe;
   the outer wall of the vacuum housing has an extended portion extending more inward than the outer armoring bricks in the radial direction of the uprising pipe or the downfalling pipe such that the outer wall is brought into contact with the lower end of the uprising pipe or the lower end of the downfalling pipe; and
   the at least one end brick positioned at the lower end of the uprising pipe or the lower end of the downfalling pipe is supported by the extended portion of the outer wall.

4. The apparatus according to claim 2, wherein the extension pipe is brought into contact with the lower end of the uprising pipe or the lower end of the downfalling pipe.

5. The apparatus according to claim 2, wherein the sealing flange is formed in a dish shape having an outer peripheral edge portion on an outer periphery, and
   the outer peripheral edge portion is mounted to the outer wall by the fixing structure.

6. An apparatus comprising:
   a glass melting furnace;
   the vacuum degassing apparatus of claim 2;
   a forming device to form molten glass which is vacuum degassed; and
   an annealing device to anneal glass.

7. A process comprising:
   melting a glass raw material to obtain molten glass;
   vacuum-degassing the molten glass by the vacuum degassing apparatus of claim 2;
   forming the molten glass which is vacuum degassed; and
   annealing the formed glass.

8. The apparatus according to claim 1, wherein the introduction pipe is constituted by assembling inner armoring bricks in contact with the molten glass and outer armoring bricks disposed outside the inner armoring bricks in a radial direction of the introduction pipe, the inner armoring bricks comprise at least one end brick at the upstream end of the introduction pipe;
   the discharge pipe is constituted by assembling inner armoring bricks in contact with the molten glass and outer armoring bricks disposed outside the inner armoring bricks in a radial direction of the discharge pipe, the inner armoring bricks comprise at least one end brick at the downstream end of the discharge pipe;
   the outer wall of the vacuum housing has an extended portion extending more inward than the outer armoring bricks in the radial direction of the introduction pipe or the discharge pipe such that the outer wall is brought into contact with the upstream end of the introduction pipe or the downstream end of the discharge pipe; and
   the at least one end brick at the upstream end of the introduction pipe or the downstream end of the discharge pipe is supported by the extended portion of the outer wall.

9. The apparatus according to claim 1, wherein the introduction pipe or the discharge pipe comprises at least one end brick which has a through hole formed therein such that the molten glass passed through the through hole formed in the at least one end brick;

the through hole formed in the at least one end brick has a large diameter portion formed in an opening thereof close to the outer wall and a small diameter portion formed so as to be continuous to the large diameter portion; and the extension pipe has an expanded portion expanding outward in a position close to the base end portion thereof in a deepest area of the large diameter portion.

10. The apparatus according to claim 9, wherein the small diameter portion comprises a protection member made of heat-resisting metal disposed on an inner peripheral surface of the small diameter portion so as to cover the inner peripheral surface.

11. The apparatus according to claim 1, wherein the introduction pipe or the discharge pipe has an end surface at the upstream end of the introduction pipe or the downstream end of the discharge pipe such that the end surface is flush with the outer surface of the outer wall, which surrounds the introduction pipe or the discharge pipe in a radial direction of the introduction pipe or the discharge pipe; and the end surface is covered by the sealing flange fixed to the outer wall of the vacuum housing.

12. The apparatus according to claim 1, wherein the sealing flange is formed in a dish shape having an outer peripheral edge portion on an outer periphery, and the outer peripheral edge portion is mounted to the outer wall by the fixing structure.

13. The apparatus according to claim 1, wherein the extension pipe has a backup flange formed at a position closer to the base end portion than the sealing flange, the introduction pipe or the discharge pipe has an end surface at the upstream end of the introduction pipe or the downstream end of the discharge pipe, and the end surface is covered by the backup flange.

14. The apparatus according to claim 1, wherein the introduction pipe and the discharge pipe are connected to the vacuum vessel in a vertical direction.

15. The apparatus according to claim 1, wherein the extension pipe is brought into contact with the upstream end of the introduction pipe or the downstream end of the discharge pipe.

16. An apparatus comprising:
a glass melting furnace;
the vacuum degassing apparatus of claim 1;
a forming device to form molten glass which is vacuum degassed; and
an annealing device to anneal glass.

17. A process comprising:
melting a glass raw material to obtain molten glass;
vacuum-degassing the molten glass by the vacuum degassing apparatus of claim 1;
forming the molten glass which is vacuum degassed; and
annealing the formed glass.

18. The apparatus according to claim 1, wherein a tip of the base end portion of the extension pipe does not contact with the introduction pipe or the discharge pipe.

19. The apparatus according to claim 1, wherein the extension pipe is detachable from the outer wall by removing the fixing structure.

20. The apparatus according to claim 1, wherein the outer wall has a tapped hole, the fixing structure is a bolt, and the extension pipe is fixed by screwing the bolt into the tapped hole.

* * * * *